United States Patent
Bach et al.

(10) Patent No.: US 7,294,656 B2
(45) Date of Patent: Nov. 13, 2007

(54) UV CURABLE COATING COMPOSITION

(75) Inventors: Hermann Bach, Mt. Lebanon, PA (US); Charles A. Gambino, McDonald, PA (US); Michael J. Dvorchak, Monroeville, PA (US); Michael K. Jeffries, Follansbee, WV (US); Richard R. Roesler, Wexford, PA (US); Ramesh Subramanian, Coraopolis, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 473 days.

(21) Appl. No.: 11/054,020

(22) Filed: Feb. 9, 2005

(65) Prior Publication Data

US 2005/0154076 A1    Jul. 14, 2005

Related U.S. Application Data

(63) Continuation-in-part of application No. 10/754,244, filed on Jan. 9, 2004, now abandoned.

(51) Int. Cl.
*C08F 2/46* (2006.01)
*C08F 2/50* (2006.01)

(52) U.S. Cl. ............... 522/97; 522/90; 522/96; 522/150; 522/151; 522/152; 522/154; 522/173; 522/174; 428/411.1; 428/423.1; 427/487; 427/508

(58) Field of Classification Search .......... 522/96, 522/97, 109, 110, 111, 112, 113, 114, 116, 522/150, 151, 152, 153, 154, 173, 174, 178, 522/179; 428/411.1, 423; 427/508, 497, 427/510
See application file for complete search history.

(56) References Cited

U.S. PATENT DOCUMENTS

| | | | |
|---|---|---|---|
| 4,188,472 A | 2/1980 | Chang | 528/75 |
| 4,340,497 A | 7/1982 | Knopf | 252/188.3 R |
| 4,956,264 A | 9/1990 | Geissler et al. | 430/281 |
| 5,093,386 A * | 3/1992 | Bishop et al. | 522/96 |
| 5,322,861 A | 6/1994 | Tsuge et al. | 522/90 |
| 5,777,024 A | 7/1998 | Killilea et al. | 524/590 |
| 6,107,361 A * | 8/2000 | Tortorello et al. | 522/96 |
| 6,306,504 B1 | 10/2001 | Meixner et al. | 428/412 |
| 6,332,291 B1 * | 12/2001 | Flosbach et al. | 522/91 |
| 6,465,539 B1 | 10/2002 | Weikard et al. | 522/90 |
| 6,534,128 B1 | 3/2003 | Carlson et al. | 427/466 |
| 6,538,044 B2 | 3/2003 | Ledniczky et al. | 522/46 |
| 6,595,394 B1 * | 7/2003 | Savala | 222/189.07 |
| 6,596,787 B1 * | 7/2003 | Levandoski et al. | 522/96 |
| 2003/0059555 A1 | 3/2003 | Fenn et al. | 427/558 |
| 2003/0210879 A1 * | 11/2003 | Oshio et al. | 385/128 |

FOREIGN PATENT DOCUMENTS

| | | |
|---|---|---|
| WO | 97/04881 | 2/1997 |
| WO | 03/027162 | 4/2003 |

\* cited by examiner

*Primary Examiner*—Sanza L. McClendon
(74) *Attorney, Agent, or Firm*—Noland J. Cheung

(57) ABSTRACT

The present invention is directed to a non-aqueous composition curable by UV radiation broadly comprising a mixture of two UV curable urethane acrylates. The invention is also directed to a coating process using such composition. One of the urethane acrylates is the reaction product of an isocyanate and a specific OH functional lactone ester (meth) acrylate. The other urethane acrylate is the reaction product of an isocyanate and a specific hydroxy functional (meth) acrylate.

20 Claims, No Drawings

UV CURABLE COATING COMPOSITION

RELATED APPLICATIONS

This application is a continuation-in-part of application, U.S. Ser. No. 10/754,244, filed Jan. 9, 2004, now abandoned.

BACKGROUND OF THE INVENTION

UV curable coatings are one of the fastest growing sectors in the coatings industry. In recent years, UV technology has made inroads into a number of market segments like fiber optics, optical- and pressure-sensitive adhesives, automotive applications like UV cured topcoats, and UV curable powder coatings. The driving force of this development is mostly the quest for an increase in productivity of the coating and curing process. In automotive refinish applications where minor repairs need to be performed swiftly and at ambient temperature, UV technology promises to significantly increase the throughput of cars in a body shop. The development of refinish applications breaks new ground in UV technology. Safety concerns associated with the use of UV lamps in body shops as well as economic constraints will likely preclude the use of high intensity light sources. Relatively inexpensive low intensity lamps that emit only in the UV-A region of the electromagnetic spectrum are taking their place, thus posing new challenges to resin developers and formulators.

UV curable coating compositions are known in the art. See, e.g., U.S. Pat. Nos. 4,188,472; 4,340,497; 6,465,539; and 6,534,128; and published PCT applications WO 97/04881 and WO 03/027162. In addition, U.S. Pat. No. 5,777,024 is directed to the reaction product of a low viscosity isocyanurate group-containing polyisocyanate, which has been modified with allophanate groups to reduce its viscosity, with hydroxyl-functional olefinic compounds such as hydroxyalkyl (meth)acrylates and lactone modified versions of these (meth)acrylates. U.S. Pat. No. 6,306,504 is directed to a coating composition for polycarbonate which contains the reaction product of a low viscosity polyisocyanate, such as a low viscosity isocyanurate group-containing polyisocyanate, with a hydroxy acrylate.

Also known are compositions that are curable using UV radiation having a very low UV-B content and substantially no UV-C content (see, e.g., U.S. Patent Application Publication 2003/0059555 and U.S. Pat. No. 6,538,044). In order to be commercially useful as a clear coat, particularly for the refinish market, a coating composition must be curable in a relatively short time, preferably under relatively low intensity radiation. In addition, such coatings must exhibit a balance between hardness (as measured by pendulum hardness) and flexibility (as measured by impact resistance). None of the coating compositions described in the above literature meet these criteria.

DESCRIPTION OF THE INVENTION

The present invention is directed to a non-aqueous composition curable by UV radiation broadly containing a mixture of two UV curable urethane acrylates. The invention is also directed to a coating process using such a composition. More particularly, the invention is directed to a composition containing A) about 5 to 95% by weight (preferably about 10 to 90% by weight and more preferably 15 to 70% by weight) of the reaction product of
  i) one or more di- and/or polyisocyanates with
  ii) a hydroxyl component containing
    ii-a) one or more hydroxy functional lactone ester (meth)acrylates having a number average molecular weight of about 200 to 2000 and having the formula:

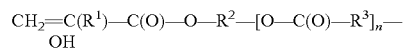
    $$CH_2=C(R^1)-C(O)-O-R^2-[O-C(O)-R^3]_n-OH$$

wherein
    n is an integer from 1 to 5,
    $R^1$ is hydrogen or methyl,
    $R^2$ represents an alkylene group or substituted alkylene group having 2 to 10 carbon atoms, which may be substituted with one or more alkyl groups having 1 to 12 carbon atoms, and
    $R^3$ represents a straight or branched chain alkylene group having 3 to 8 carbon atoms, which may be substituted with one or more alkyl groups having 1 to 12 carbon atoms, and
    ii-b) up to 30 hydroxyl equivalent %, based on the total hydroxyl equivalents of component A-ii), of a hydroxyl compound other than A-ii-a),
  wherein the NCO:OH equivalent ratio of component A-i) to component A-ii) is 1.10:1 to 1:1.10, B) about 5 to 95% by weight (preferably about 10 to 90% by weight and more preferably about 15 to 70% by weight) of the reaction product of
  i) one or more di- and/or polyisocyanates with
  ii) a hydroxyl component containing
    ii-a) one or more hydroxy functional (meth)acrylates of the formula:

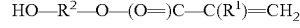
    $$HO-R^2-O-(O=)C-C(R^1)=CH_2$$

wherein $R^1$ and $R^2$ are as defined above and
    ii-b) up to 30 hydroxyl equivalent %, based on the total hydroxyl equivalents of component B-ii), of a hydroxyl compound other than B-ii-a),
  wherein the NCO:OH equivalent ratio of component B-i) to component B-ii) is 1.10:1 to 1:1.10, C) 0 to about 30% by weight (and preferably about 10 to 25% by weight) of one or more reactive diluents selected from mono-, di-, tri- and tetra (meth)acrylates, and D) about 0.1 to 10% by weight (and preferably about 3 to 7% by weight) of one or more photoinitiators, wherein the %'s by weight of components A), B) and C) total 100%, based on the total weights of components A), B) and C), and wherein the % by weight of component D) is based on the total weight of components A), B), and C), and E) about 5 to 95% by weight, based on the weight of components A), B), C) and D) (and preferably about 20 to 80% by weight and more preferably 30 to 70% by weight) of a solvent or solvent mixture.

The compositions of the invention have several advantages over conventional radiation-curable compositions. They can be cured in a relatively short time using UV-C (200-280 nm), UV-B (280-320 nm), UV-A (320-400 nm) and visible (400 nm and above) radiation. In particular, they can be cured using radiation having a wavelength of 320 nm or more. When fully cured (regardless of the type of radiation used), the coatings exhibit hardnesses and impact resistances at least comparable to conventional coatings.

Component A

Component A is a reaction product of
i) one or more di- and/or polyisocyanates with
ii) a hydroxyl component containing
   ii-a) one or more hydroxy functional lactone ester (meth)acrylates having a number average molecular weight of about 200 to 2000 and having the formula:

$CH_2=C(R^1)-C(O)-O-R^2-[O-C(O)-R^3]_n-OH$ wherein
   n is an integer from 1 to 5, preferably 1 or 2 and more preferably 2,
   $R^1$ is hydrogen or methyl, preferably hydrogen,
   $R^2$ represents an alkylene group or substituted alkylene group having 2 to 10 carbon atoms, preferably 2 to 4 carbon atoms and more preferably 2 carbon atoms; which may be substituted with one or more alkyl groups having 1 to 12 carbon atoms, preferably one alkyl group and more preferably one methyl group, and
   $R^3$ represents a straight or branched chain alkylene group having 3 to 8 carbon atoms, preferably 5 carbon atoms; which may be substituted with one or more alkyl groups having 1 to 12 carbon atoms, but preferably is unsubstituted, and
   ii-b) up to 30 hydroxyl equivalent %, based on the total hydroxyl equivalents of component A-ii), of a hydroxyl compound other than A-ii-a).

The polyisocyanates include substantially any organic di- and/or polyisocyanate. Aromatic, araliphatic, aliphatic or cycloaliphatic di- and/or polyisocyanates and mixtures of such isocyanates may be used. Preferred are diisocyanates of the formula $R^4(NCO)_2$, wherein $R^4$ represents an aliphatic hydrocarbon residue having 4 to 12 carbon atoms, a cycloaliphatic hydrocarbon residue having 6 to 15 carbon atoms, an aromatic hydrocarbon residue having 6 to 15 carbon atoms or an araliphatic hydrocarbon residue having 7 to 15 carbon atoms. Specific examples of suitable isocyanates include xylylene diisocyanate, tetramethylene diisocyanate, 1,4-diisocyantobutane, 1,12-diisocyanatododecane, hexamethylene diisocyanate, 2,3,3-trimethylhexamethylene diisocyanate, 1,4-cyclohexylene diisocyanate, 4,4'-dicyclohexylmethane diisocyanate, 4,4'-dicyclohexyl diisocyanate, 1-diisocyanato-3,3,5-trimethyl-5-isocyanatomethylcyclohexane (isophorone diisocyanate), 1,4-phenylene diisocyanate, 2,6-tolylene diisocyanate, 2,4-tolylene diisocyanate, 1,5-naphthylene diisocyanate, 2,4'- or 4,4'-diphenylmethane diisocyanate, 4,4'-diphenyldimethylmethane diisocyanate, α,α,α',α'-tetramethyl-m- or -p-xylylene diisocyanate, and triphenylmethane 4,4',4"-triisocyanate as well as mixtures thereof. Hexamethylene diisocyanate, 4,4'-dicyclohexylmethane diisocyanate and isophorone diisocyanate and the mixtures thereof are the presently preferred isocyanates. Also suitable are monomeric triisocyanates such as 4-isocyanatomethyl-1,8-octamethylene diisocyanate.

Polyisocyanate adducts containing isocyanurate, iminooxadiazine dione, urethane, biuret, allophanate, uretidione and/or carbodiimide groups are also useful as the isocyanate component. Such polyisocyanates may have isocyanate functionalities of 3 or more. Such isocyanates are prepared by the trimerization or oligomerization of diisocyanates or by the reaction of diisocyanates with polyfunctional compounds containing hydroxyl or amine groups. Preferred is the isocyanurate of hexamethylene diisocyanate, which may be prepared in accordance with U.S. Pat. No. 4,324,879.

Especially preferred are low viscosity polyisocyanates having a viscosity at 23° C. and at 100% solids of less than 2000 mPa·s, preferably less than 1500 and more preferably 800 to 1400 mPa·s. Examples of these polyisocyanates include isocyanurate group-containing polyisocyanates prepared by trimerizing hexamethylene diisocyanate until the reaction mixture has an NCO content of 42 to 45, preferably 42.5 to 44.5 wt. %, subsequently terminating the reaction and removing unreacted hexamethylene diisocyanate by distillation to a residual content of less than 0.5 wt. %; uretdione group-containing polyisocyanates which may present in admixture with isocyanurate group-containing polyisocyanates; biuret group-containing polyisocyanates which may be prepared according to the processes disclosed in U.S. Pat. Nos. 3,124,605; 3,358,010; 3,903,126; and 3,903,127; isocyanurate and allophanate group-containing polyisocyanates which may be prepared in accordance with the processes set forth in U.S. Pat. Nos. 5,124,427, 5,208,334 and 5,235,018; and iminooxadiazine dione and optionally isocyanurate group-containing polyisocyanates which may be prepared in the presence of special fluorine-containing catalysts as described in DE-A 19611849.

The hydroxy functional lactone ester (meth)acrylates useful herein are known in the art. The esters (hereinafter "lactone-acrylate adducts") are prepared by reacting an appropriate lactone with an acrylate or methacrylate acid ester.

Lactones employed in the preparation of the lactone-acrylate adducts typically have the formula:

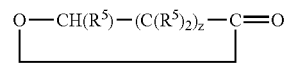

wherein $R^5$ is hydrogen or an alkyl group having 1 to 12 carbon atoms, and z is 2 to 7. Preferred lactones are the ε-caprolactones wherein z is 4 and at least 6 of the $R^5$'s are hydrogen with the remainder, if any, being alkyl groups. Preferably, none of the substituents contain more than 12 carbon atoms and the total number of carbon atoms in these substituents on the lactone ring does not exceed 12. Unsubstituted ε-caprolactone, i.e., where each $R^5$ is hydrogen, is a derivative of 6-hydroxyhexanoic acid. Both the unsubstituted and substituted ε-caprolactones are available by reacting the corresponding cyclohexanone with an oxidizing agent such as peracetic acid.

Substituted ε-caprolactones found to be most suitable for preparing the present lactone-acrylate adducts are the various ε-monoalkylcaprolactones wherein the alkyl groups contain 1 to 12 carbon atoms, e.g., ε-methyl-caprolactone, ε-ethyl-caprolactone, ε-propyl-caprolactone and ε-dodecyl-caprolactone. Useful also are the ε-dialkylcaprolactones in which the two alkyl groups are substituted on the same or different carbon atoms, but not both on the omega carbon atoms.

Also useful are the ε-trialkylcaprolactones wherein 2 or 3 carbon atoms in the lactone ring are substituted provided, though, that the omega carbon atom is not di-substituted. The most preferred lactone starting reactant is ε-caprolactone wherein z in the lactone formula is 4 and each $R^5$ is hydrogen.

The acrylate or methacrylate acid esters utilized to prepare the lactone-acrylate adducts contain 1 to 3 acrylyl or α-substituted acrylyl groups and one or two hydroxyl groups. Such esters are commercially available and/or can be readily synthesized. Commercially available esters include the hydroxyalkyl acrylates or hydroxyalkyl methacrylates wherein the alkyl group contains 2 to 10 carbon atoms, preferably 2 to 4 carbon atoms. The hydroxyalkyl acrylates and methacrylates have the following formula:

$$CH_2=CR^1-C(O)O-R^2-OH$$

wherein $R^1$ is hydrogen or methyl and $R^2$ is a linear or a branched alkylene group having 2 to 10 carbon atoms, preferably 2 to 4 carbon atoms.

Examples of suitable hydroxyalkyl acrylates and methacrylates include 2-hydroxyethyl acrylate, 2-hydroxypropyl acrylate, 3-hydroxypropyl acrylate, 2-hydroxybutyl acrylate, 4-hydroxybutyl acrylate, 3-hydroxypentyl acrylate, 6-hydroxynonyl acrylate, 2-hydroxyethyl methacrylate, 2-hydroxypropyl methacrylate, 3-hydroxypropyl methacrylate, 2-hydroxybutyl methacrylate, 2-hydroxypentyl methacrylate, 5-hydroxypentyl methacrylate, 7-hydroxyheptyl methacrylate and 5-hydroxydecyl methacrylate.

Preferred lactone-acrylate adducts have the formula:

$$CH_2=CR^1-C(O)O-R^2-(O-C(O)R^3)_2-OH$$

wherein $R^1$, $R^2$, and $R^3$ are as described above.

The lactone-acrylate adduct is prepared by reacting the lactone with the hydroxyalkyl acrylate in the presence of less than about 200 parts per million of a catalyst. The catalysts which may be used include one or more organometallic compounds and other metallic compounds such as stannic chloride or ferric chloride and other Lewis or protonic acids. Preferred catalysts include stannous octoate, dibutyltin dilaurate, and other tin compounds; titanates such as tetraisopropyl titanate and butyl titanate; and the like. The reaction can be carried out at a temperature of about 100° C. to 400° C., preferably about 120° C. to 130° C. The reaction may be carried out at atmospheric pressure, although higher or lower pressures may be used. The reaction is generally carried out in the presence of oxygen to inhibit polymerization of the hydroxyalkyl acrylate. The reaction is generally carried out for a period of about 2 to 20 hours. The reaction is carried out in the presence of a suitable inhibitor to prevent polymerization of the hydroxyalkyl acrylate double bond. These inhibitors include the monomethyl ether of hydroquinone, benzoquinone, phenothiazine, methyl hydroquinone, 2,5-di-t-butylquinone, hydroquinone, benzoquinone and other common free radical inhibitors known in the art. The level of inhibitor used is less than 1000 parts per million, preferably less than 800 parts per million, and most preferably, less than 600 parts per million. The molar ratio of the lactone to hydroxyl groups in the ester is about 1:0.1 to 1:5, and preferably about 1:0.3 to 1:3.

An example of a lactone-acrylate adduct preferred for use in the present invention is a caprolactone-2-hydroxyethyl acrylate adduct supplied by Dow under the tradename TONE M-100, which has the formula $$CH_2=CH-C(O)O-CH_2-CH_2-(O-C(O)(CH_2)_5)_2-OH.$$

While a preferred embodiment of the invention contains two molecules of lactone, on the average, per acrylate group, useful products can have one to five lactone units per acrylate group, or can be a mixture of compounds that contain one to five lactone units. In addition to caprolactone, the lactone units could be derived from other lactones such as beta-propiolactone, delta-valerolactone, delta-butyrolactone, zeta-enantholactone, and eta-caprylolactone, or substituted lactones such as 6-methyl-epsilon-caprolactone, 3-methyl-epsilon-caprolactone, 5-methyl-epsilon-caprolactone, 4-methyl-delta-valerolactone, and 3,5-dimethyl-epsilon caprolactone.

Other hydroxyl compounds A-ii-a) may be saturated or unsaturated, preferably saturated, and include mono- to trihydric aliphatic alcohols having a number average molecular weight of 32 to 400, such as methanol, ethanol, n-hexanol, isooctanol, isododecanol, benzyl alcohol, ethylene glycol, diethylene glycol, propylene glycol, 2-ethyl-1, 3-hexane diol, glycerol and alcohols obtained from these alcohols by alkoxylation.

For reaction with the isocyanate, lactone-acrylate adduct A-ii-a), optional hydroxyl component A-ii-b), isocyanate component A-i) and the inhibitor may be added to the reaction vessel in any order. The amounts of the reactants are selected such that the number of isocyanate groups of isocyanate component A-i) to the number of hydroxyl groups of hydroxyl component A-ii) is essentially equivalent, i.e., the NCO:OH equivalent ratio is 1.10:1 to 1:1.10, preferably 1.05:1 to 1:1.05 and more preferably 1.02:1 to 1:1.02. After the reactants have been added a catalytic amount of a urethane catalyst, e.g., dibutyl tin dilaurate, is added and the mixture is typically heated to a temperature of about 40 to 90° C., preferably about 60° C. During the initial reaction exotherm the temperature is maintained below 90° C. After the reaction mixture cools the temperature is maintained between 60° C. and 70° C. until the isocyanate content is <0.5% by weight as measured for example by titration with dibutyl amine. If the isocyanate content is too high, an additional amount of hydroxyl component A-ii) can be added to react with any remaining isocyanate groups. Thereafter, the product is cooled prior to storage.

Alternatively, either of the components A-i) or A-ii) can be added with the other additives and then the other reactant can be added. When the isocyanate component is added first, it is possible to initially add less than the total quantity of the hydroxyl component. After the reaction is essentially complete, the isocyanate content can be determined and then the remainder of the hydroxyl component can be added in amount that is essentially equivalent to the number of isocyanate groups remaining.

Further details as to the production of the lactone esters and/or the reaction products of the lactone esters with isocyanates can be found in U.S. Pat. Nos. 4,188,472, 4,340,497, 4,429,082, 4,504,635, 4,683,287, 6,465,539 and 6,534,128 (the disclosures of which are herein incorporated by reference), WO 97/04881, WO 03/027162, and German Offenlegungsschrift 2,914,982.

Component B

Component B) is the reaction product of
i) one or more di- and/or polyisocyanates with
ii) a hydroxyl component containing
   ii-a) one or more hydroxy functional (meth)acrylates of the formula:

$$HO-R^2-O-(O=)C-C(R^1)=CH_2$$

wherein
   $R^1$ and $R^2$ are as defined above and
   ii-b) up to 30 hydroxyl equivalent %, based on the total hydroxyl equivalents of component B-ii), of a hydroxyl compound other than B-ii-a), wherein the NCO:OH equivalent ratio of component B-i) to component B-ii) is 1.10:1 to 1:1.10, preferably 1.05:1 to 1:1.05 and more preferably 1.02:1 to 1:1.02.

Useful isocyanates B-i) are those described for the production of Component A, and can be the same as or different from the isocyanate used to prepare Component A. Similarly, the useful hydroxy functional (meth)acrylates B-ii-a) are those described for use in producing the lactone esters A-ii-a) and the useful hydroxyl compounds B-ii-b) are those previously set forth for producing component A).

The reaction of isocyanate component B-i) with hydroxyl component B-ii) is generally carried out in the manner described for preparing component A), including the reactants, their amounts and the reaction conditions.

Examples of suitable compounds B) are disclosed in U.S. Pat. No. 6,332,360, the disclosure of which is herein incorporated by reference.

Component C—Reactive Diluent

Useful reactive diluents are selected from mono-, di-, tri- and tetra (meth)acrylates. Specific examples include, tetrahydrofuryl methacrylate; tetrahydrofuryl acrylate; isobornyl (meth) acrylate; (meth)acrylate; octyl (meth)acrylate; iso-octyl (meth)acrylate; isononyl (meth)acrylate; ethyl diglycol (meth)acrylate; isobornyl (meth)acrylate; 2-(2-ethoxyethoxy)ethyl (meth)acrylate; 2-ethylhexyl (meth) acrylate; lauryl (meth)acrylate; butanediol mono(meth)acrylate; isobutyl (meth)acrylate; 2-hydroxyethyl (meth) acrylate; isodecyl (meth)acrylate; dodecyl (meth)acrylate; n-butyl (meth)acrylate; methyl (meth)acrylate; hexyl (meth) acrylate; stearyl (meth)acrylate; hydroxymethyl (meth)acrylate; hydroxypropyl (meth)acrylate; hydroxyisopropyl (meth)acrylate; hydroxybutyl (meth)acrylate; hydroxyisobutyl (meth)acrylate; tetrahydrofurfuryl (meth)acrylate; and mixtures thereof. Examples of higher functional, radiation curable monomers include ethylene glycol di(meth) acrylate; hexanediol di(meth)acrylate; triethylene glycol di(meth)acrylate; tetraethylene glycol di(meth)acrylate; trimethylolpropane tri(meth)acrylate; ethoxylated trimethylolpropane tri(meth)acrylate; glycerol tri(meth)acrylate; pentaerythritol tri(meth)acrylate; pentaerythritol tetra(meth) acrylate; neopentylglycol di(meth)acrylate; and mixtures thereof.

If present, the reactive diluent is used in an amount of up to about 30% by weight.

Component D—Photoinitiator

A variety of photoinitiators can be utilized in the radiation-curing compositions of the present invention. The usual photoinitiators are the type that generate free radicals when exposed to radiation energy. Illustrative of suitable photoinitiators include 2,2-diethoxyacetophenone; 2- or 3- or 4-bromoacetophenone; 3- or 4-allyl-acetophenone; 2-acetonaphthone; benzaldehyde; benzoin; the alkyl benzoin ethers; benzophenone; benzoquinone; 1-chloroanthraquinone; p-diacetyl-benzene; 9,10-dibromoanthracene; 9,10-dichloroanthracene; 4,4-dichlorobenzophenone; thioxanthone; isopropyl-thioxanthone; methylthioxanthone; α,α,α-trichloro-para-t-butyl acetophenone; 4-methoxybenzophenone; 3-chloro-8-nonylxanthone; 3-iodo-7-methoxyxanthone; carbazole; 4-chloro-4'-benzylbenzophenone; fluoroene; fluoroenone; 1,4-naphthylphenylketone; 1,3-pentanedione; 2,2-di-sec.-butoxy acetophenone; dimethoxyphenyl acetophenone; propiophenone; isopropylthioxanthone; chlorothioxanthone; xanthone; and mixtures thereof. There are several suitable photoinitiators commercially available from Ciba including Irgacure 184 (1-hydroxy-cyclohexyl-phenyl-ketone); Irgacure 819 (bis(2,4,6-trimethylbenzoyl)-phenylphosphineoxide); Irgacure 1850 (a 50/50 mixture of bis(2,6-dimethoxybenzoyl)-2,4,4-trimethylpentyl-phosphine oxide and 1-hydroxy-cyclohexyl-phenyl-ketone); Irgacure 1700 (a 25/75 mixture of bis(2,6-dimethoxybenzoyl)-2,4,4-trimethylpentyl-phosphine oxide and 2-hydroxy-2-methyl-1-phenyl-propan-1-one); Irgacure 907 (2-methyl-1 [4-(methylthio)phenyl]-2-morpholonopropan-1-one); Darocur MBF (a pheny glyoxylic acid methyl ester) and Darocur 4265 (a 50/50 mixture of bis(2,4,6-trimethylbenzoyl)-phenylphosphine-oxide and 2-hydroxy-2-methyl-1-phenyl-propan-1-one). The foregoing lists are meant to be illustrative only and are not meant to exclude any suitable photoinitiators known to those skilled in the art. Those skilled in the art will know the concentrations at which photoinitiators are effectively employed and generally the concentration will not exceed about 10% by weight of the radiation-curable coating composition.

Those skilled in the art of photochemistry are fully aware that photoactivators can be used in combination with the aforementioned photoinitiators and that synergistic effects are sometimes achieved when such combinations are used. Photoactivators are well known in the art and require no further description to make known what they are and the concentrations at which they are effective. Nonetheless, one can mention as illustrative of suitable photoactivators, methylamine, tributylamine, methyldiethanolamine, 2-aminoethylethanolamine, allylamine, cyclohexylamine, cyclopentadienylamine, diphenylamine, ditolylamine, trixylylamine, tribenzylamine, n-cyclohexylethyleneimine, piperidine, N-methylpiperazine, 2,2-dimethyl-1,3-bis(3-N-morpholinyl)-propionyloxy-propane, and mixtures thereof.

Component E—Solvents

The radiation-curable coating compositions of the present invention contain conventional solvents. Suitable solvents include any organic solvents, preferably those known from surface coating technology. Examples of useful solvents include acetone, methyl ethyl ketone, methyl isobutyl ketone, ethyl acetate, n-butyl acetate, methoxypropyl acetate, N-methylpyrrolidone, petroleum spirit, chlorobenzene, toluene, xylene, higher aromatic solvents (such as the Solvesso solvents from Exxon), cyclohexanone, 1,1,1-trichloroethane, methyl amyl ketone, ethoxyethyl acetate, methylene chloride, and the like, and mixtures thereof.

Other Additives

The coating compositions may also include various additives in conventional quantities, such as pigments (including both organic and inorganic pigments), oils, particularly silicone oil, surfactants such as silicone-alkylene oxide copolymers, e.g., L-7604, L-7610, etc., commercially available from Dow, silicone oil containing aliphatic epoxide groups, fluorocarbon surfactants such as FC-171 commercially available from 3M and FC-430 and FC-431 also commercially available from 3M, Modaflow commercially available from UCB Chemical and other similar type compounds that are used to improve the flow and leveling characteristics of coatings. Other optional additives include one or more colorants, slip modifiers, thixotropic agents, foaming agents, antifoaming agents, flow or other rheology control agents, waxes, oils, plasticizers, binders, antioxidants, photoinitiator stabilizers, fungicides, bactericides, organic and/or inorganic filler particles, leveling agents, opacifiers, antistatic agents, dispersants, and the like.

The compositions of the present invention are made by mixing together the desired ingredients using any suitable technique. For example, in a one step approach, all of the ingredients are combined and blended, stirred, milled, or otherwise mixed to form a homogeneous composition. As another alternative, component A), B) and C) may be blended together in a first step. Then, in one or more additional steps, any or all additional components may be incorporated into the composition via blending, milling, or other mixing technique.

The compositions of the present invention may be applied in any suitable fashion onto a substrate such as retroreflective substrates, metal, paper, woven or nonwoven fabrics, resin-coated paper, foil, wood, wood products, composites, polymer articles (e.g., automotive exterior light fixtures, bumpers and fascia) and polymer films. Representative examples of coating techniques include screen printing, spraying, ink jetting, gravure coating, knife coating, roll coating, brushing, curtain coating, flexographic printing, offset printing, and the like.

The compositions of the present invention are highly compatible with both porous and nonporous substrates. The compatibility with nonporous materials allows these compositions to be applied onto a wide range of nonporous polymer films, including polybutylene terephthalate, polyethylene terephthalate, other polyester, polyolefin, polymethyl (meth)acrylate, vinyl acetate, ABS, polyvinyl, polystyrene, high impact polystyrene, polycarbonate, polyurethane, epoxy, polyimide, polyamide, polyamideimide, polyacrylate, polyacrylamide, combinations of these, and the like. Because radiation curing generates little heat, the compositions of the present invention may also be used on heat sensitive substrates.

After being coated, the compositions may be cured using a suitable type of curing energy. The amount of curing energy to be used for curing depends upon a number of factors, such as the amount and the type of reactants involved, the energy source, web speed, the distance from the energy source, and the thickness of the material to be cured. Generally, the rate of curing tends to increase with increased energy intensity. The rate of curing also may tend to increase with increasing amounts of photoinitiator being present in the composition. As general guidelines, actinic radiation typically involves a total energy exposure of about 0.1 to 10 J/cm$^2$, and electron beam radiation typically involves a total energy exposure in the range from less than 1 megarad to 100 megarads or more, preferably 1 to 10 Mrads. Exposure times may be from less than about 1 second up to 10 minutes or more. Radiation exposure may occur in air or in an inert atmosphere such as nitrogen.

The formulations of this invention can be cured by ionizing or non-ionizing radiation means including, but not limited to, ultraviolet light, gamma radiation, and electron beam radiation. These curing methods and the equipment that can be used for them are well known to those skilled in the art. When the binder is to be cured by non-ionizing radiation, the presence of a photoinitiator therein is desirable. Suitable sources of radiation include mercury, xenon, halogen, carbon arc lamps, sunlight, and radioactive sources. It is even possible to cure automotive headlamps coated with the compositions according to the invention by using automotive headlights. Exposures may be from less than about 1 second to 10 minutes or more, depending upon the amounts of particular polymerizable materials and photoinitiator being utilized and depending upon the radiation source and distance from the source, and the thickness of the coating to be cured. The compositions may also be photopolymerized by exposure to electron beam radiation. Generally speaking, the dosage necessary is from less than 1 megarad to 100 megarads or more.

The coated substrate is subjected to UV radiation, preferably radiation having a wavelength of at least 320 nm and more preferably radiation having a wavelength of about 320 to 450 nm. The distance between the surface and the radiation source will depend on the spectral overlap of lamp emission spectrum and photoinitiator absorption spectrum and on the intensity of the lamp. The length of time the coated substrate is subjected to the radiation will depend on the spectral overlap of lamp emission spectrum and photoinitiator absorption spectrum, the lamp intensity, the distance from the radiation sources, the solvent content in the formulation, and the temperature and humidity of the surroundings. The time will generally be less than 10 minutes and may be as short as 0.1 seconds.

As noted above, the compositions are preferably cured using radiation sources having wavelengths of at least 320 nm, preferably about 320 to 450 nm. The radiation can be provided by any suitable source such as UV lamps having reduced infrared emission or UV lamps fitted with filters to eliminate infrared emissions or so-called LEDs (light-emitting devices) emitting radiation in the wavelength noted. Particularly useful commercially available devices include: the Panacol UV H-254 lamp (available from Panacol-Elsol Gmbh—a 250 W ozone-free, iron doped metal halide lamp with spectral wavelength of 320 to 450 nm); the Panacol UVF-450 lamp (320 nm to 450 nm depending on the black, blue or clear filter used); the Honle UVA HAND 250 CUL lamp (available from Honle UV America Inc—emitting maximum intensity UVA range of ~320 to 390 nm); the PMP 250 watt metal halide lamp (available from Pro Motor Car Products Inc); the Con-Trol-Cure—UV LED Cure-All 415 lamp (available from UV Process Supply Inc.—spectral wavelength of 415 nm with a 2.5 to 7.95 W operating wattage range); the Con-Trol-Cure—UV LED Cure-All 390 lamp (also available from UV Process Supply Inc.—spectral wavelength of 390 nm with a 2.76 to 9.28 W operating wattage range); the UV H253 UV lamp (available from UV Light Technologies—the unit contained a 250 W iron doped metal halide lamp fitted with a black glass filter to produce a spectral wavelength of between 300 and 400 nm); and the Cure-Tek UVA-400 (available from H&S Autoshot—the lamp has a 400-watt metal halide bulb and the lamp assembly can be fitted with different filters to control or eliminate the visible and infra-red radiation).

The examples that follow are intended to illustrate the invention without restricting its scope. All parts and percents are by weight unless otherwise indicated.

EXAMPLES

Component A: A three neck flask provided with stirrer, heating mantle and condenser was charged with 342 parts by weight of Desmodur N-3600 (1.91 equivalent) (Desmodur N-3600 is a commercially available product from Bayer Polymers LLC and is a trimerized hexane diisocyanate containing less than 0.25% by weight of monomeric hexane diisocyanate, having an NCO content of about 23% by weight and a viscosity at 23° C. of about 1200 mPa·s) and 658 parts by weight of Tone M-100 (1.91 equivalents). 5 drops of dibutyltin dilaurate were then added and the reaction mixture was allowed to exotherm to 60° C. After about 5 hours, the reaction mixture was allowed to cool to room temperature. The resultant product had an NCO content (as measured by FTIR) of 0.19% by weight and a viscosity of 18,560 cps @ 25° C.

Component B: A three neck flask provided with stirrer, heating mantle and condenser was charged with 498 parts by weight of Desmodur N-3600 (2.78 equivalents), 197 parts by weight of butylacetate (solvent), 0.41 parts by weight of dibutyltin dilaurate and 0.41 parts by weight of 2,6-ditert-butyl-4-methylphenol ("BHT"). 88 parts by weight of hydroxypropylacrylate (0.68 equivalents) was then added over a period of 10 minutes, while the temperature was kept between 35 and 50° C. 183 parts by weight of hydroxyethylacrylate (1.58 equivalents) was then added over a period of 30 minutes, while the temperature was kept between 35 and 50° C. The reaction mixture was then allowed to exotherm. Once the exotherm was over, the reactor temperature was set to 60° C. and kept at that temperature for about 2 hours. At this time the isocyanate content was determined by titration and an amount of 2-ethyl-1,3-hexanediol (25 parts by weight, 0.34 equivalents) was added that corresponded on an equivalent basis to the number of isocyanate groups remaining. 0.41 parts by weight of BHT were also added. The reaction was continued until the % NCO as measured by FTIR was less than 0.5% by weight.

Other materials used:

OL44—Borchers Baysilone OL40, a polyether polysiloxane flow and leveling agent available from Borchers.

PETIA—a 1:1 mixture of pentaerythritol triacrylate and pentaerythritol tetraacrylate available for UCB Chemical.

D4265—Darocur4265—a 1:1 mixture of 2-hydroxy-2-methyl-1-phenyl-1-propan-1-one and bis(phenyl)-2,4,6-trimethylbenzoyl-phosphine oxide available from Ciba Specialty Chemicals.

I184—Irgacure 184—1-Hydroxycyclohexyl phenyl ketone photoinitiator, available from Ciba Specialty Chemicals.

T400—Tinuvin 400—2-hydroxyphenyltriazine, available from Ciba Specialty Chemicals.

T292—Tinuvin 292—a hindered amine light stabilizer available from Ciba Specialty Chemicals.

S3206—Sanduvor 3206—an UV absorber from Clariant Corporation

S3058—Sanduvor 3058—a hindered amine light stabilizer from Clariant Corporation

I819—Irgacure 819—Bis(2,4,6-trimethylbenzoyl)-phenylphosphineoxide, available from Ciba Specialty Chemicals.

R960—Titanium dioxide pigment, available from DuPont

Coating Example A

A glass jar was charged with 117 parts by weight of Component B, 94 parts by weight of Component A, and 28 parts by weight of PETIA. 13 parts by weight of D4265, 2 parts by weight of I84, 5 parts by weight of T400, 2 parts by weight of T292, 0.1 parts by weight of OL44 and 139 parts by weight of n-butyl acetate were added. The formulation was mixed for a couple of minutes by shaking and applied to a steel panel using a draw down bar at 3 to 5 mils wet film thickness. The formulation was cured using a Cure-Tek UVA-400 lamp by irradiating for 4 minutes at a lamp-sample distance of 10 inches. The resultant product had an impact strength (as measured according to ASTM D 2794) of 50 inch pounds and pendulum hardness (as measured according to ASTM D 4366-95—Test Method A) of 130 seconds.

Coating Example B

A glass jar was charged with 98 parts by weight of Component B, 106 parts by weight of Component A, and 30 parts by weight of PETIA. 13 parts by weight of D4265, 2 parts by weight of I84, 5 parts by weight of T400, 2 parts by weight of T292, 0.1 parts by weight of OL44 and 143 parts by weight of n-butyl acetate were added. The formulation was mixed for a couple of minutes by shaking and applied to a steel panel using a draw down bar at 3 to 5 mils wet film thickness. The formulation was cured using a Cure-Tek UVA-400 lamp by irradiating for 4 minutes at a lamp-sample distance of 10 inches. The resultant product had an impact strength of 50 inch pounds and a pendulum hardness of 132 seconds.

Coating Example C

A glass jar was charged with 34 parts by weight of Component B, 136 parts by weight of Component A, and 52 parts by weight of PETIA. 13 parts by weight of D4265, 2 parts by weight of I84, 5 parts by weight of T400, 2 parts by weight of T292, 0.1 parts by weight of OL44 and 157 parts by weight of n-butyl acetate were added. The formulation was mixed for a couple of minutes by shaking and applied to a steel panel using a draw down bar at 3 to 5 mils wet film thickness. The formulation was cured using a Cure-Tek UVA-400 lamp by irradiating for 4 minutes at a lamp-sample distance of 10 inches. The resultant product had an impact strength of 55 inch pounds and a pendulum hardness of 125 seconds.

Coating Example D

A glass jar was charged with 67.84 parts by weight of Component B, 84.80 parts by weight of Component A, 25.44 parts by weight of PETIA and 16.96 parts by weight of hexanediol diacrylate. 7.8 parts by weight of D4265, 1.95 parts by weight of I84, 4.88 parts by weight of Sanduvor 3206, 1.95 parts by weight of Sanduvor 3058, 0.1 parts by weight of OL44 and 188 parts by weight of n-butyl acetate were added. The formulation was mixed for a couple of minutes by shaking and applied to a steel panel using a draw down bar at 3 to 5 mils wet film thickness. The formulation was cured using a Cure-Tek UVA-400 lamp by irradiating for 4 minutes at a lamp-sample distance of 10 inches. The resultant product had an impact strength (as measured according to ASTM D 2794) of 50 inch pounds and pendulum hardness (as measured according to ASTM D 4366-95—Test Method A) of 129 seconds.

Coating Example E

A glass jar was charged with 68.66 parts by weight of Component B and 6.1 parts by weight of Component A. 3.05 parts by weight of D4265, 0.61 parts by weight of I84, 0.31 parts by weight of OL44 and 21.27 parts by weight of n-butyl acetate were added. The formulation was mixed for a couple of minutes by shaking and spray applied to a polycarbonate panel at 3 to 4 mils wet film thickness. The formulation was cured using a Cure-Tek UVA-400 lamp by irradiating for 4 minutes at a lamp-sample distance of 10 inches. The resultant coating had excellent adhesion.

Blend Study

A detailed evaluation of the coatings performance of blends of Component A and Component B was carried out.

The components and amounts were the same as in Coating Example E except for the amounts of Components A and B, which were varied as set forth in Tables 1 and 2. The results are also shown in the Tables 1 and 2.

TABLE 1

| Component A/B Blend | MEK Double Rubs | | | |
|---|---|---|---|---|
| Weight Ratio | Initial | 1 day | 3 days | 7 days |
| 0/100 | 100 | 100 | 100 | 100 |
| 20/80 | 100 | 200 | 100 | 100 |
| 50/50 | 100 | 100 | 100 | 100 |

TABLE 2

| Component A/B Blend | Pendulum Hardness | | | | |
|---|---|---|---|---|---|
| Weight Ratio | Initial | 1 day | 3 days | 7 days | Adhesion |
| 0/100 | 95 | 98 | 99 | 102 | 100% |
| 20/80 | 79 | 81 | 83 | 83 | 100% |
| 50/50 | 33 | 40 | 51 | 57 | 100% |

Cure condition: Cure-Tek UVA-400 lamp, 10 inches/4 mins
MEK Double Rub test on B952 steel panels
Pendulum Hardness on glass panels
Adhesion on Polycarbonate panels AL 2647

Coating Example F

A paint can was charged with 100 parts by weight of Component A, 80 parts by weight of Component B and 20 parts by weight of hexanediol diacrylate. 12 parts by weight of 1819 was added and stirred well until it dissolved in the resin mixture. Then 40 parts by weight of R960 pigment were added and ground well. The resulting white pigmented coating was applied to a steel panel using a draw down bar at about 3 mils wet film thickness. The formulation was cured using a Cure-Tek UVA-400 lamp by irradiating for 5 minutes at a lamp-sample distance of 5 inches. The resultant coating had excellent adhesion to the substrate and good solvent resistance (passed 100 MEK double rub test).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A radiation curable coating composition comprising
A) about 5 to 95% by weight of the reaction product of
   i) one or more di- and/or polyisocyanates and
   ii) a hydroxyl component comprising
      ii-a) one or more hydroxy functional lactone ester (meth)acrylates having a number average molecular weight of about 200 to 2000 and having the formula:

$CH_2=C(R^1)-C(O)-O-R^2-[O-C(O)-R^3]_n-OH$ wherein
      n is an integer from 1 to 5,
      $R^1$ is hydrogen or methyl,
      $R^2$ represents an alkylene group or substituted alkylene group having 2 to 10 carbon atoms, which may be substituted with one or more alkyl groups having 1 to 12 carbon atoms, and
      $R^3$ represents a straight or branched chain alkylene group having 3 to 8 carbon atoms, which may be substituted with one or more alkyl groups having 1 to 12 carbon atoms, and
      ii-b) up to 30 hydroxyl equivalent %, based on the total hydroxyl equivalents of component A-ii), of a hydroxyl compound other than A-ii-a),
   wherein the NCO:OH equivalent ratio of component A-i) to component A-ii) is 1.10:1 to 1:1.10,
B) about 5 to 95% by weight of the reaction product of
   i) one or more di- and/or polyisocyanates with
   ii) a hydroxyl component comprising
      ii-a) one or more hydroxy functional (meth)acrylates of the formula:

$HO-R^2-O-(O=)C-C(R^1)=CH_2$ wherein $R^1$ and $R^2$ are as defined above, and
      ii-b) up to 30 hydroxyl equivalent %, based on the total hydroxyl equivalents of component B-ii), of a hydroxyl compound other than B-ii-a),
   wherein the NCO:OH equivalent ratio of component B-i) to component B-ii) is 1.10:1 to 1:1.10,
C) 0 to about 30% by weight of one or more reactive diluents comprising a member selected from the group consisting of mono-, di-, tri- and tetra (meth)acrylates, and
D) about 0.1 to 10% by weight of one or more photoinitiators, wherein the %'s by weight of components A), B) and C) total 100%, based on the total weight of components A), B) and C), and wherein the % by weight of component D) is based on the total weight of components A), B), and C), and
E) about 5 to 95% by weight, based on the weight of components A), B), C) and D) of a solvent or solvent mixture.

2. The composition of claim 1 wherein isocyanate components A-i) and B-i) may be the same or different and comprise hexamethylene diisocyanate, 4,4'-dicyclohexylmethane diisocyanate, isophorone diisocyanate, 4-isocyanatomethyl-1,8-octamethylene diisocyanate and/or a polyisocyanate adduct containing isocyanurate, iminooxadiazine dione, urethane, biuret, allophanate, uretidione and/or carbodiimide groups.

3. The composition of claim 2 wherein said polyisocyanate adduct has a viscosity at 23° C. and at 100% solids of less than 2000 mPa·s.

4. The composition of claim 1 wherein isocyanate components A-i) and B-i) may be the same or different and comprise a polyisocyanate adduct (i) prepared from 1,6-hexamethylene diisocyanate, (ii) having a viscosity at 23° C. and at 100% solids of less than 2000 mPa·s and (iii) containing isocyanurate, iminooxadiazine dione, urethane, biuret, allophanate, uretidione and/or carbodiimide groups.

5. The composition of claim 1 wherein in component A), n is 2, $R^1$ is H, $R^2$ is $C_2$-alkylene, and $R^3$ is a $C_5$-alkylene and in component B), $R^2$ is $C_2$-$C_4$-alkylene, which may be substituted with a methyl group.

6. The composition of claim 2 wherein in component A), n is 2, $R^1$ is H, $R^2$ is $C_2$-alkylene, and $R^3$ is a $C_5$-alkylene and in component B), $R^2$ is $C_2$-$C_4$-alkylene, which may be substituted with a methyl group.

7. The composition of claim 4 wherein in component A), n is 2, $R^1$ is H, $R^2$ is $C_2$-alkylene, and $R^3$ is a $C_5$-alkylene and in component B), $R^2$ is $C_2$-$C_4$-alkylene, which may be substituted with a methyl group.

8. The composition of claim 1 comprising about 10 to 90% by weight of component A) and 10 to 90% by weight of component B).

9. The composition of claim 2 comprising about 10 to 90% by weight of component A) and 10 to 90% by weight of component B).

10. The composition of claim 4 comprising about 10 to 90% by weight of component A) and 10 to 90% by weight of component B).

11. The composition of claim 5 comprising about 10 to 90% by weight of component A) and 10 to 90% by weight of component B).

12. The composition of claim 6 comprising about 10 to 90% by weight of component A) and 10 to 90% by weight of component B).

13. The composition of claim 7 comprising about 10 to 90% by weight of component A) and 10 to 90% by weight of component B).

14. A process for preparing a coated product comprising coating a substrate with a coating composition and subjecting the coated substrate to radiation for a time sufficient to cure the composition, wherein said coating composition comprises:
A) about 5 to 90% by weight of the reaction product of
  i) one or more di- and/or polyisocyanates with
  ii) a hydroxyl component comprising
    ii-a) one or more hydroxy functional lactone ester (meth)acrylates having a number average molecular weight of about 200 to 2000 and having the formula:

$CH_2=C(R^1)-C(O)-O-R^2-[O-C(O)-R^3]_n-OH$ wherein
    n is an integer from 1 to 5,
    $R^1$ is hydrogen or methyl,
    $R^2$ represents an alkylene group or substituted alkylene group having 2 to 10 carbon atoms, which may be substituted with one or more alkyl groups having 1 to 12 carbon atoms, and
    $R^3$ represents a straight or branched chain alkylene group having 3 to 8 carbon atoms, which may be substituted with one or more alkyl groups having 1 to 12 carbon atoms, and
    ii-b) up to 30 hydroxyl equivalent %, based on the total hydroxyl equivalents of component A-ii), of a hydroxyl compound other than A-ii-a),
  wherein the NCO:OH equivalent ratio of component A-i) to component A-ii) is 1.10:1 to 1:1.10,
B) about 5 to 95% by weight of the reaction product of
  i) one or more di- and/or polyisocyanates with
  ii) a hydroxyl component comprising
    ii-a) one or more hydroxy functional (meth)acrylates of the formula:

$HO-R^2-O-(O=)C-C(R^1)=CH_2$ wherein $R^1$ and $R^2$ are as defined above, and
    ii-b) up to 30 hydroxyl equivalent %, based on the total hydroxyl equivalents of component B-ii), of a hydroxyl compound other than B-ii-a),
  wherein the NCO:OH equivalent ratio of component B-i) to component B-ii) is 1.10:1 to 1:1.10,
C) 0 to about 30% by weight of one or more reactive diluents comprising a member selected from the group consisting of mono-, di-, tri- and tetra (meth)acrylates, and
D) about 0.1 to 10% by weight of one or more photoinitiators, wherein the %'s by weight of components A), B) and C) total 100%, based on the total weight of components A), B) and C), and wherein the % by weight of component D) is based on the total weight of components A), B), and C), and
E) about 5 to 95% by weight, based on the weight of components A), B), C) and D) of a solvent or solvent mixture.

15. The process of claim 14 wherein said radiation is UV radiation.

16. The process of claim 15 wherein said radiation has a wavelength of at least 320 nm.

17. The process of claim 15 wherein said radiation has a wavelength of about 320 to 450 nm.

18. The process of claim 14 wherein said radiation is UV radiation and said substrate is an automotive exterior light fixture.

19. The process of claim 18 wherein said radiation has a wavelength of about 320 to 450 nm.

20. The process of claim 18 wherein said radiation is provided by an automotive headlight.

* * * * *